US007751633B1

(12) United States Patent
Mukherjee

(10) Patent No.: US 7,751,633 B1
(45) Date of Patent: Jul. 6, 2010

(54) METHOD FOR COMPRESSING AN IMAGE

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 979 days.

(21) Appl. No.: 11/513,808

(22) Filed: Aug. 31, 2006

(51) Int. Cl.
G06K 9/36 (2006.01)
G06K 9/46 (2006.01)
G06K 9/00 (2006.01)

(52) U.S. Cl. .................... 382/239; 382/232; 382/244; 382/166

(58) Field of Classification Search ............ 382/232, 382/238, 239, 244, 166
See application file for complete search history.

(56) References Cited

U.S. PATENT DOCUMENTS

| 4,937,681 | A | | 6/1990 | Fujinawa et al. |
| 5,657,015 | A | | 8/1997 | Nakajima et al. |
| 5,682,204 | A | | 10/1997 | Uz et al. |
| 5,699,457 | A | | 12/1997 | Adar et al. |
| 5,986,712 | A | | 11/1999 | Peterson et al. |
| 6,023,297 | A | | 2/2000 | Kobayashi |
| 6,038,346 | A | * | 3/2000 | Ratnakar ............ 382/239 |
| 6,075,819 | A | | 6/2000 | Saw |
| 6,084,636 | A | | 7/2000 | Sugahara et al. |
| 6,094,455 | A | | 7/2000 | Katta |
| 6,285,458 | B1 | | 9/2001 | Yada |
| 6,320,981 | B1 | | 11/2001 | Yada |
| 6,590,936 | B1 | | 7/2003 | Kadono |
| 6,658,157 | B1 | | 12/2003 | Satoh et al. |
| 6,865,298 | B2 | * | 3/2005 | Li ............ 382/238 |
| 6,944,357 | B2 | | 9/2005 | Bossut et al. |
| 7,003,167 | B2 | | 2/2006 | Mukherjee |
| 7,136,533 | B2 | * | 11/2006 | Seroussi et al. ....... 382/238 |

FOREIGN PATENT DOCUMENTS

| EP | 0774858 | 5/1997 |
| EP | 0874520 | 10/1998 |
| EP | 0997847 | 5/2000 |

OTHER PUBLICATIONS

Memon et al. "Lossless compression of RGB color images", Optical Engineering, Jun. 1995, vol. 34 No. 6, pp. 1711-1717.*
Kobayashi et al. "Lossless compression for RGB color still images", Proceedings of International Conference on Image Processing, 1999. vol. 4, pp. 73-77.*
Mukherjee, D. et al., "Low Complexity Guaranteed Fit Compound Document Compression", IEEE ICIP 2002.

* cited by examiner

Primary Examiner—Samir A. Ahmed
Assistant Examiner—Li Liu

(57) ABSTRACT

In a method for compressing an image, source data is converted into a series of blocks each containing one or more colors. A baseline target block size is determined based upon a target compression ratio for the source data. For each block in turn, a compression mode is selected from mode families, where the mode families include an n-color mode family, an interpolated mode family, a raw mode family, a BTC-VQ mode family, a lossless mode family, and a 4×4 transform mode family. In addition, for each block in turn, the block is compressed using the selected compression mode to yield a corresponding compressed block.

18 Claims, 7 Drawing Sheets

METHOD FOR COMPRESSING AN IMAGE

BACKGROUND

Much of modern progress is associated with advances in computer technology, which have permitted ever more rapid and complex data processing. However, the amounts of data to be processed have easily kept pace with the increases in processing power. For example, scanning an 8×10 image at 24-bit color (continuous-tone) resolution and 300 dots per inch (dpi) results in about 20 MB of data. If the resolution is 600 dpi, the quantity of data is close to 80 MB, making image handling and processing a resource-intensive task.

In many applications, data compression is used to reduce the amount data required to represent an image. Data compression is the re-encoding of data in a more compact form. If the compressed data can be expanded to replicate the original (uncompressed) data, the compression is said to be "lossless". If this is not possible, the compression is said to be lossy. While lossless compression is preferable in principle, lossy compression can often achieve dramatically greater reductions in data. In the case of some images, dramatic reductions in data can be achieved using lossy compression with no perceptible loss of image quality. In other cases, even more dramatic reductions can be achieved with acceptable compromises in image quality.

In some applications, such as certain laser printing applications, there is insufficient memory to store a full-size uncompressed image. In such applications, the image must be compressed so that the entire compressed image fits within a predetermined memory size. There are, however, significant costs that can be incurred in using these compression techniques. For example, there can be substantial system overhead and time required to perform the compression and decompression operations.

A compression scheme that guarantees that a target image size will be met is characterized as "guaranteed fit". Furthermore, from considerations of fast operation and low memory requirements, it must also be compressed as it is received, that is, in a "single pass".

Not all image compression schemes, however, are suitable for single-pass guaranteed-fit applications. The wavelet-based JPEG 2000 can guarantee a fit, but typically operates on an entire image (and so does not qualify as "single pass"); in addition, wavelet-based compression schemes are processor intensive and so exact a performance penalty.

Block-based compression schemes are well-suited for single-pass compression. Block-based compression schemes typically break an image into blocks, (for instance, 8×8 pixels) and compress the blocks individually. Common JPEG and block-truncation coding (BTC) are two such block-based compression schemes.

The popular JPEG compression scheme is block-based and as such can be used for single pass compression, but it provides no guarantee of fit in a designated buffer in a single pass; also, for rare pathological images it may even expand rather than compress.

"Block Truncation Coding" (BTC) (first proposed by E. J. Delp and O. R. Mitchell, "Image Compression using block truncation coding," IEE Trans. Comm., vol. COM-27, pp. 1335 42, 1979) refers to a family of coding techniques where small blocks (typically 4×4) of monochrome images are represented with two grayscale levels 8 bits each, and a 1-bit/pixel binary mask denoting the level to use for each pixel. While the coding scheme is lossy in principle, it is to be noted that for blocks with only two levels—as is commonly encountered in text and graphics portions of an image—the scheme becomes lossless. A comprehensive survey of BTC encoding is presented by P. Franti, O. Nevalainen, T. Kaukoranta, "Compression of digital Images by block truncation coding: a survey," Computer Journal, col. 37, no. 4, pp. 308-32, 1994.

Vector Quantization (VQ) refers to a popular signal compression scheme where multiple scalar elements are grouped together and reproduced using a few vector reproduction levels. VQ is discussed in A. Gersho and R. M. Gray, Vector Quantization and Signal Compression, Boston, Mass.: Kluwer, 1992. For RGB color images, BTC may be combined with VQ to yield a family of techniques called BTC-VQ, as disclosed in Y. Wu and D. C. Coll, "Single bit-map block truncation coding of color images," IEEE J. Selected Areas in Comm., vol. 10, pp. 952 959, and in T. Kurita and N. Otsu, "A method for block truncation coding for color image compression," IEEE trans. Commun., vol. 41, no. 9, pp. 1270 74, September 1993. In BTC-VQ, small blocks (typically 4.times.4) of RGB color images are represented with two RGB reproduction levels 24 bits each, and a 1-bit/pixel binary mask. Thus, a compression ratio of 6:1 is immediately achieved for 4.times.4 blocks.

BTC-VQ can achieve single-pass guaranteed fit corresponding to 6:1 compression using 8.times.8 blocks, and greater guaranteed fit compression using larger blocks. However, BTC-VQ can result in visible artifacts in continuous-tone photographic images, especially if more than 6:1 compression is desired, forcing using of larger blocks.

Common JPEG is a block-based compression scheme that works well with continuous tone photographic images. JPEG allows a flexible tradeoff between compression and resulting image quality via selection of a "quality factor". Normally, a guaranteed fit is achieved in JPEG by trial-and-error selection of quality factors, with each "trial" being a separate pass. To accomplish guaranteed fit in one pass regardless of the image, a sufficiently low quality factor must be selected. With such a low quality factor, the resulting image quality can be visibly degraded, especially in text and graphics portions of compound documents.

Some optical character recognition and other programs, such as Omnipage by Caere, divide an image into text and non-text blocks via a prescan so that the two types of blocks can be treated separately. However, such prescan techniques do not meet the single-pass requirement.

BRIEF DESCRIPTION OF THE DRAWINGS

Features of the present invention will become apparent to those skilled in the art from the following description with reference to the figures, in which.

DETAILED DESCRIPTION

Figure 1:
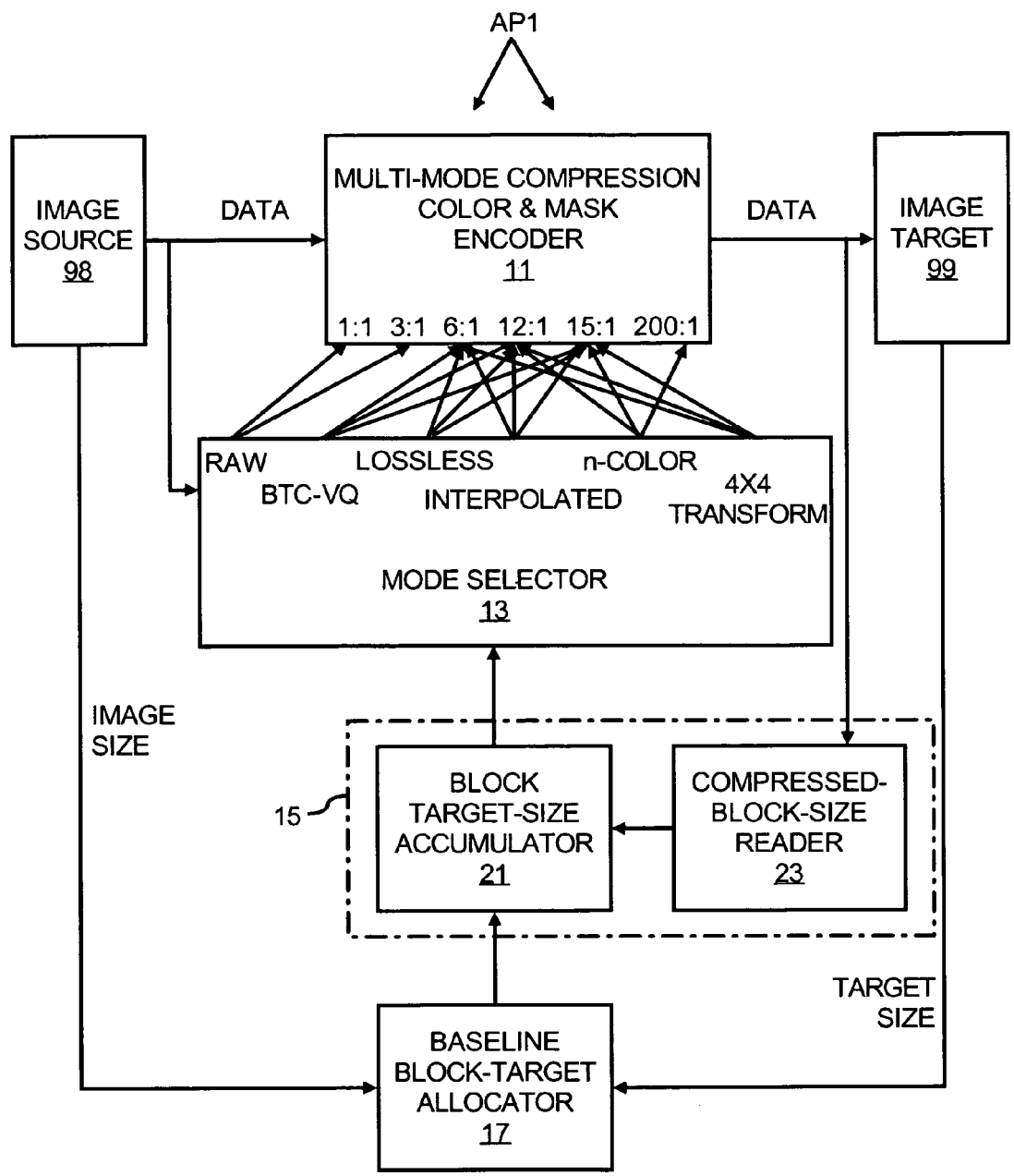
FIG. 1 is a schematic diagram of a compression system in accordance with an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are methods and systems for data compression. Examples of the methods and systems disclosed herein generally provide for high-speed, high-quality, single-pass, guaranteed-fit, compression of continuous-tone compound documents (containing an arbitrary combination of text, graphics and photographic images). In addition, the methods and systems may be configured to implement a compression scheme during data compression as a function of an in-progress measure of compression. To the extent the compression of leading data exceeds its target, the resulting unused memory is reallocated to adjust the target memory size for trailing data. The compression scheme may be considered as "greedy" in that it is adjusted to consume the reallocated memory as soon as possible, given a "guaranteed-fit" constraint, which may be characterized as a compression scheme that guarantees that a target image size will be met.

For example, if 6:1 compression is required for the target image, a first block will be compressed using a compression mode designed to guarantee 6:1 compression. If in fact, 12:1 compression is achieved, half the memory "reserved" for the first block remains unused. This unused memory is then reallocated to the second block, so weaker compression is acceptable for the second block; in this case, for instance, the compression scheme is adjusted to guarantee 9:1 compression for the second block. Note that if sufficient memory is saved, a block can be transmitted raw (uncompressed).

Among the modes guaranteeing a fit to the target block size, a set of highest-expected-quality modes may be identified. This set of modes includes a mode with the highest expected quality and any modes that differ at most insignificantly from it in expected quality. From the set of highest-expected-quality modes, the mode with the greatest compression is selected to maximize the memory saved for compressing the next block.

The compression mode selected for a block is selected from a family of modes best chosen to match the block's content. Thus, while BTC-VQ may serve as a default mode family, blocks with few colors, as often occur with text and simple graphics, may be more effectively compressed using an n-color compression mode.

In addition to BTC-VQ and n-color modes, a family of interpolated compression modes that are particularly effective when the block analysis indicates the gradients represented in the block are small may be used to compress the blocks. For instance, an image block may be transmitted uncompressed when the allocated target size is sufficient. More generally, uncompressed transmission may consider one of a family of raw modes that also includes "truncated raw" modes, in which color data is compressed simply by leaving off the least-significant bits.

Further to the above-identified mode families, a family of lossless modes may be used to compress the blocks. A lossless mode may be used to compress the blocks in situations where the raw modes or truncated-raw modes are available, but the lossless modes provide a better compression bit-rate. In these instances, a lossless mode may be used because the lossless mode may yield a compression-bit rate that is relatively higher than the raw mode and the truncated-raw mode.

Still further to the above-identified mode families, a family of 4×4 transform modes may be used to compress the blocks. The 4×4 transform modes may be used because they generally approximate the characteristics of a 4×4 DCT and may be implemented through bit-shifts and additions. In addition, the quantization may be performed through use of bit-shifts only, such that, there are no multiplication or divisions needed in the entire encoding or decoding process. Moreover, because the 4×4 transform is near-orthogonal, the transform performs relatively better de-correlation, and complications in compensating for differences in coefficient energies during the quantization process are reduced or eliminated. Furthermore, the use of 4×4 transform modes may guarantee a minimum compression ratio.

Although reference has been made to particular compression modes above, other mode families may be used with the compression scheme regulation systems and methods disclosed herein, for instance, based upon the types of images being compressed and the available processing power.

Generally speaking, the compression scheme regulation systems and methods disclosed herein provide for different schemes to meet different speed-versus-effectiveness requirements and to handle different source image resolutions. For example, where speed is at a premium, 6:1 compression of a 300 dpi image may be obtained without multiplications; however, 12:1 compression of the same image may readily be achieved using a high-performance embodiment of the invention using few multiplications per encoder stage. In addition, a high-resolution embodiment may achieve 15:1 compression for 600 dpi images.

For any of these examples, the complexity of the proposed encoder and decoder is orders of magnitude smaller than other known image-compression algorithms. At most, a few multipliers are needed at any stage of the encoder and none are needed in the decoder. For compound documents, text is typically compressed lossless, and depending on the type of image, the actual compression ratio achieved may be 200:1 or higher.

Since it provides adaptive image compression based on a block-by-block image analysis, the compression scheme disclosed herein is better adapted to compound documents than previously known fixed-mode compression schemes. Overall, the present invention provides performance that is highly competitive with the more expensive algorithms like JPEG-LS and JPEG, and this performance is achieved in a single pass at much lower cost in both software and hardware.

With reference first to FIG. 1, there is shown a schematic diagram of a compression system AP1, according to an example. Although particular reference has been made herein below to the compression system AP1 as including particular features, it should be understood that the compression system AP1 may include additional components and that some of the components described herein may be removed and/or modified without departing from a scope of the compression system AP1.

As shown in FIG. 1, the compression system AP1 receives image data from an image source 98 and provides compressed image data to an image target 99. In one example, the compression system AP1 may be embedded in a color laser printer that also includes image target 99 in the form of an image-storage buffer. In addition, the image source 98 may comprise a host computer and the source image data need not be accessible at any one time by the compression system AP1. Instead, the image source data may be serialized, for instance, as a series of blocks, for presentation to the compression system AP1.

The compression system AP1 comprises a compressor-encoder 11, a mode selector 13, an evaluator 15, and a baseline-block-target allocator 17. The baseline-block-target allocator 17 determines the amount of compression required to achieve a desired target size for an image. This determination is made, for instance, by comparing a source-image size (typically indicated in a header for the source image file) with a known capacity of the image-target 99.

The mode selector 13 selects a specific encoding mode to be implemented by the encoder 11. In addition, the mode selector 13 analyzes each source image block to determine the optimal mode family for compressing each source image block. The mode families include BTC-VQ, n-color, raw, interpolated, lossless, and 4×4 transform modes. Each mode family can include plural modes that achieve different levels of compression, as indicated in FIG. 1 by the arrows from mode selector 13 to encoder 11. Note that the compression levels are roughly indicated for expository purposes and are not meant to limit the compression system AP1.

Evaluator 15, which includes a block target-size accumulator 21 and a compressed block-size reader, determines the block target size. The target size for the first block is the baseline target size, as determined by allocator 17. For succeeding blocks, the target size is the baseline target size plus the target size of the preceding block (stored by accumulator 21) minus the size of the previous compressed block. Reader 23 reads the size of the previously compressed block from the header of the compressed block file.

Figure 2:
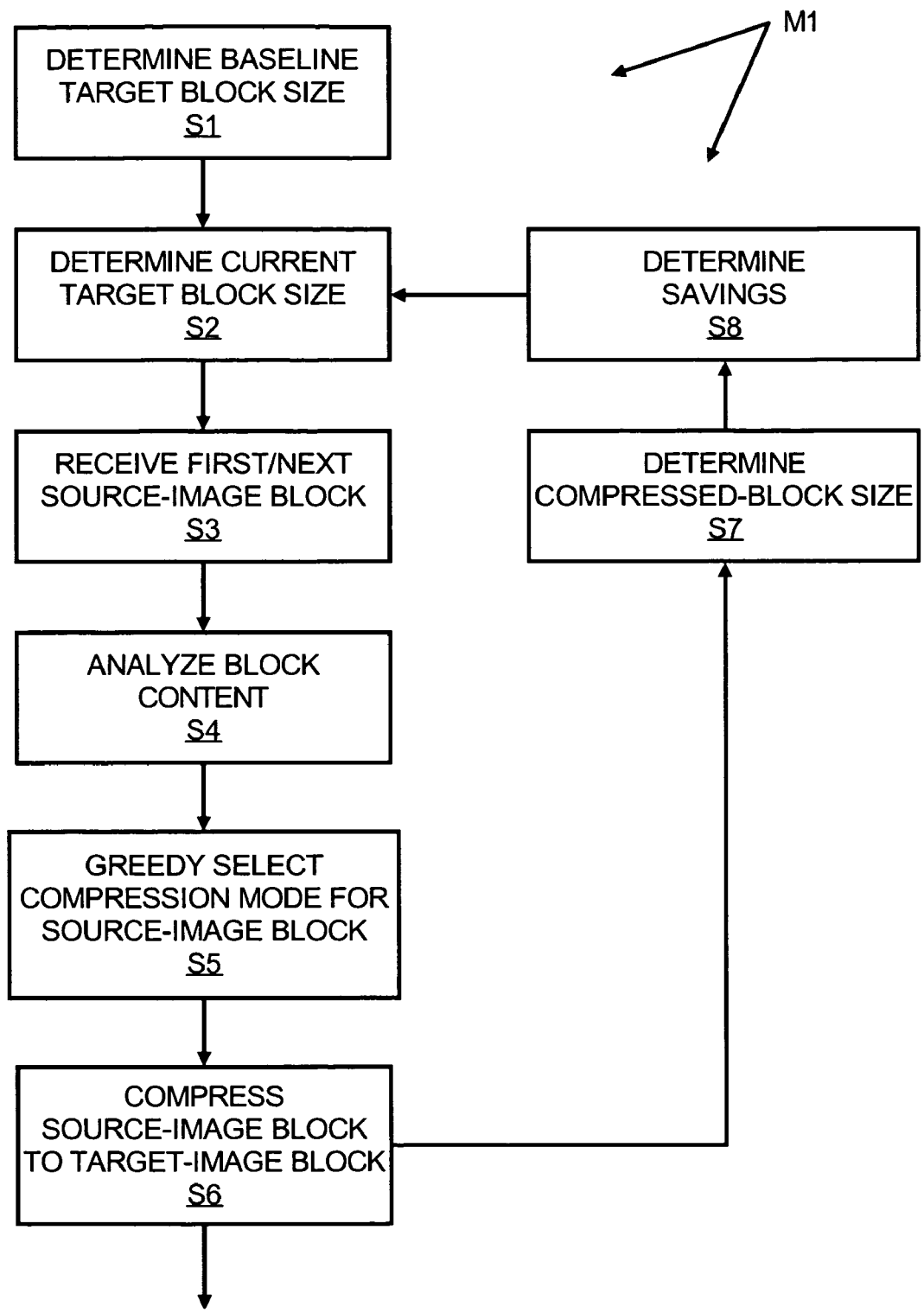
FIG. 2 is a flow chart of a generalized method practiced in the context of the system of FIG. 1 in accordance with an embodiment of the invention.

A compression method M1 as implemented by the compression system AP1 as shown in the flow-chart of FIG. 2. It is to be understood that the following description of the method M1 is but one manner of a variety of different manners in which an example of the invention may be practiced. It should also be apparent to those of ordinary skill in the art that the method M1 represents a generalized illustration and that other steps may be added or existing steps may be removed, modified or rearranged without departing from a scope of the method M1.

At step S1, the method M1 determines a baseline block target size, which if met for each block would yield the desired overall target size for the compressed image. Typically, the overall target size is predetermined by the overall compression system AP1, while the source image size is typically read from a header in the source-image data. The baseline block target size is the source-image block size multiplied by the ratio of the source image size divided by the target image size. In other words, the baseline compression ratio for the blocks is the same as the target compression ratio for the entire image.

For example, if the source image is 80 MB and the memory available for the compressed image is 10 MB, then the target compression ratio is 8:1. The source image block size is typically 8×8 pixels and 24-bits per pixel, which is 1536 bits or, equivalently, 192 bytes. The target block size is the source block size divided by the target compression ratio, in this case 192/8=24 bytes.

At step S2, a current target-block size is determined. For the first iteration of step S2, the current target-block size equals the baseline target-block size determined in step S1. For subsequent iterations of step S2, the current target-block size is the baseline target-block size plus the "savings" determined at step S8 for the preceding block.

At step S3, the source image data is received and processed serially. Herein, "serially" means that the data is not processed all at once, but in some order so that feedback from a leading image data may be used to affect the compression of a trailing image data. For the present purposes, the processing is serial even if different sections of the image are being processed in parallel, as long as each parallel stream is processed as a series. Note that steps S2 and S3 are not causally linked so they may occur in reverse order or concurrently.

Figure 3:
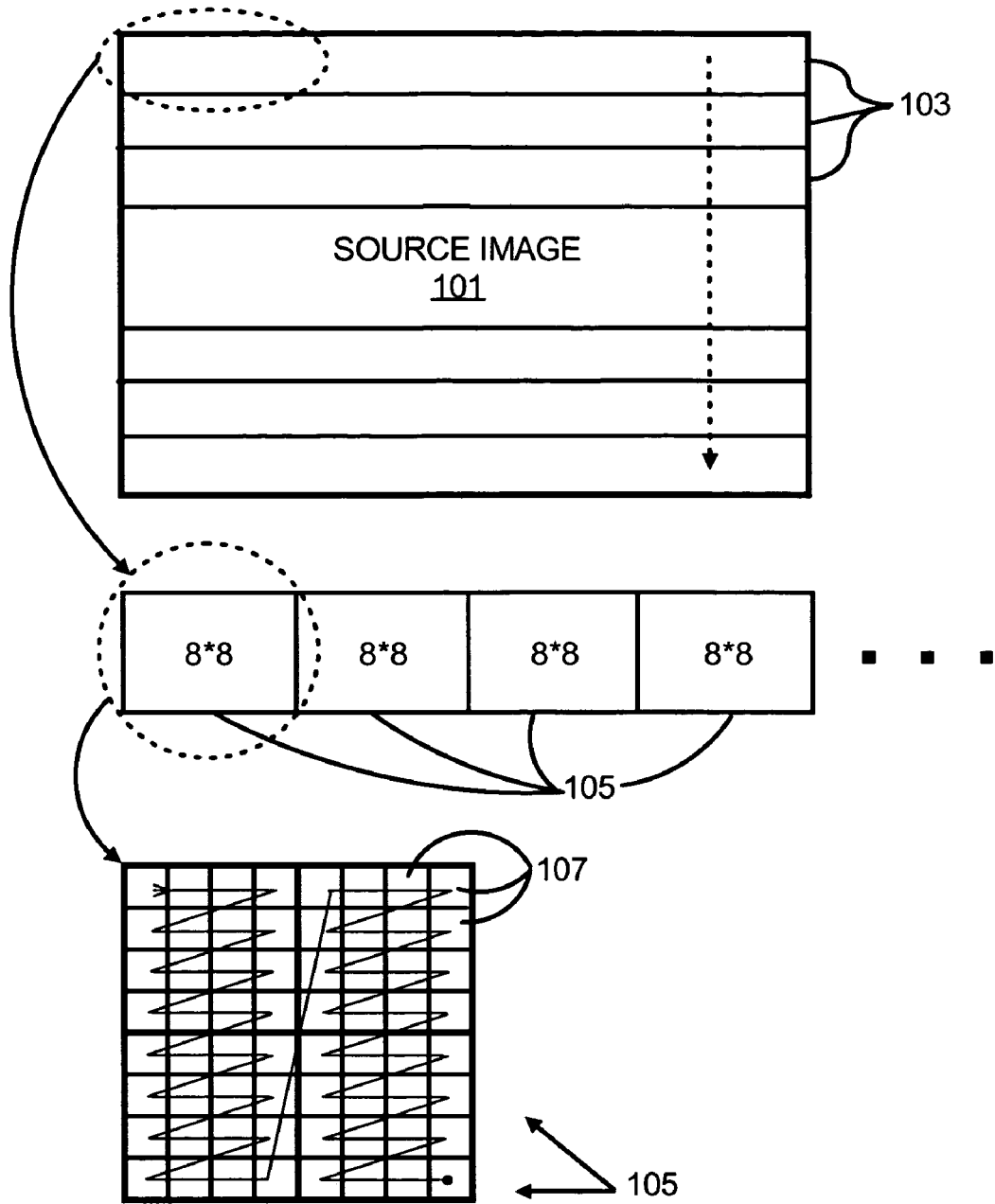
FIG. 3 is schematic view with varying levels of detail of an image showing the scanning order for that image, according to an embodiment of the invention.

Source image 101 is in true-color (24-bit per pixel) RGB format. As indicated in FIG. 3, the source image 101 is received as a series of strips 103; each strip 103 is received as a series of blocks 105; and each block 105 is received as a series of picture elements (pixels) 107. In this case, step S3 and subsequent steps apply on a block-by-block basis. Thus, in the first iteration of step S3, the first source-image block is received.

More generally, the source image 101 may be serialized in other ways. For example, the image may be presented first as coarse blocks, followed by fine blocks encoded as deviations from the coarse blocks. Also, fractal image data may be received. Of course, the compression scheme is selected to correspond to the source image data format.

At step S4, FIG. 2, the block content is analyzed. For example, the number of distinct colors in a block may be ascertained to determine whether an n-color mode should be used to compress the block. Depending on circumstances to be detailed below, color range, clustering, and gradient characteristics may be examined with an end toward mode selection.

At step S5, the compression mode for the block is selected. Modes that cannot guarantee a fit to the current target block size determined in step S2 are excluded from consideration. From the remaining modes, a set of highest-expected-quality modes is determined. This set includes a mode with the highest-expected-quality and any other modes with expected qualities that differ insignificantly from the highest-expected-quality mode. From this set, the mode that achieves the strongest compression is selected to optimize savings for the next block. In a refinement for the final block, the highest-expected-quality mode is selected without regard to savings.

At step S6, the current image block is compressed according to the compression mode selected in step S5. In FIG. 2, the arrow extending downward from step S6 indicates the compressed data being directed to the target storage area. Method M1 completes once step S6 is performed for the last block; steps S7 and S8 apply to all blocks but the last.

At step S7, the size of the compressed block resulting from step S6 is determined by compressed block-size reader 19 (FIG. 1). The difference between the determined compressed block size and the target block size for the current block is the "savings" in capacity. If the compressed block size equals the target block size for a block, the savings is zero. However, if, as often is the case, the compressed block size is less than the target block size for a block, the savings is the difference. The savings determined at step S8 is added to the baseline to determine the target size for the next iteration of step S2 for the next image block. The family and mode selections of steps S4 and S5 guarantee that the compressed block size cannot be greater than the target block size for any block.

The method M1 provides for fast, high-performance, and high-resolution variants. A "fast" variant of the method M1 is charted in FIG. 4 as method M2. The primary objective in this "fast" variant is to create a compound document codec that operates super fast at both the encoder and decoder ends, and achieves a guaranteed compression ratio of 6:1 for all documents irrespective of content. The quality is visually lossless for all computer-generated documents at resolution 300 dpi and above. There are no multipliers used at any stage of the encoding or decoding operation. In fact, the complexity in the fast method M2 is far lower than any known compound document encoder.

At step S21, an image block is received; its target-block size has already been determined. Steps S22 and S23 collectively assign the block to a compression mode. At step S22, if a block has four or fewer colors, it is assigned to the n-color mode family. If a block has more than four colors, it is assigned at step S23 to the BTC-VQ mode family unless there is room to transmit the block raw. In the latter case, step S23 assigns the block to the "raw" mode family, which, in fast method M2 only includes one mode: untruncated raw.

Encoding is performed at step S30. If, at step S22, the block was determined to have four or fewer colors (as it might if it were text or simple graphics), the block is encoded losslessly using a 1, 2, or 4-color mode with 24-bit colors at step S31. A four-entry adaptive color dictionary may be used to further the compression. Only colors not in the dictionary need to be encoded raw; those in the dictionary may be transmitted as dictionary indices. In cases where the available bytes are not sufficient to transmit colors raw, each color is quantized to 12 bits and included in the bit stream without use of the dictionary. The n-color bit stream is then run-length encoded.

In the n-color mode, the required colors, either new or from the dictionary, along with binary or 4-ary mask data, are transmitted to the decoder with an explicit header. If three colors are found, it is transmitted as a 4-color block with a dummy dictionary color. If a single color is found, run-length encoding is used.

If, at step S23, the block is determined to have more than four colors (as it is likely to have if it is part of a continuous-tone image), and there is sufficient target capacity (192 bytes), the block may be left uncompressed (raw) as indicated at step S33.

Figure 5:
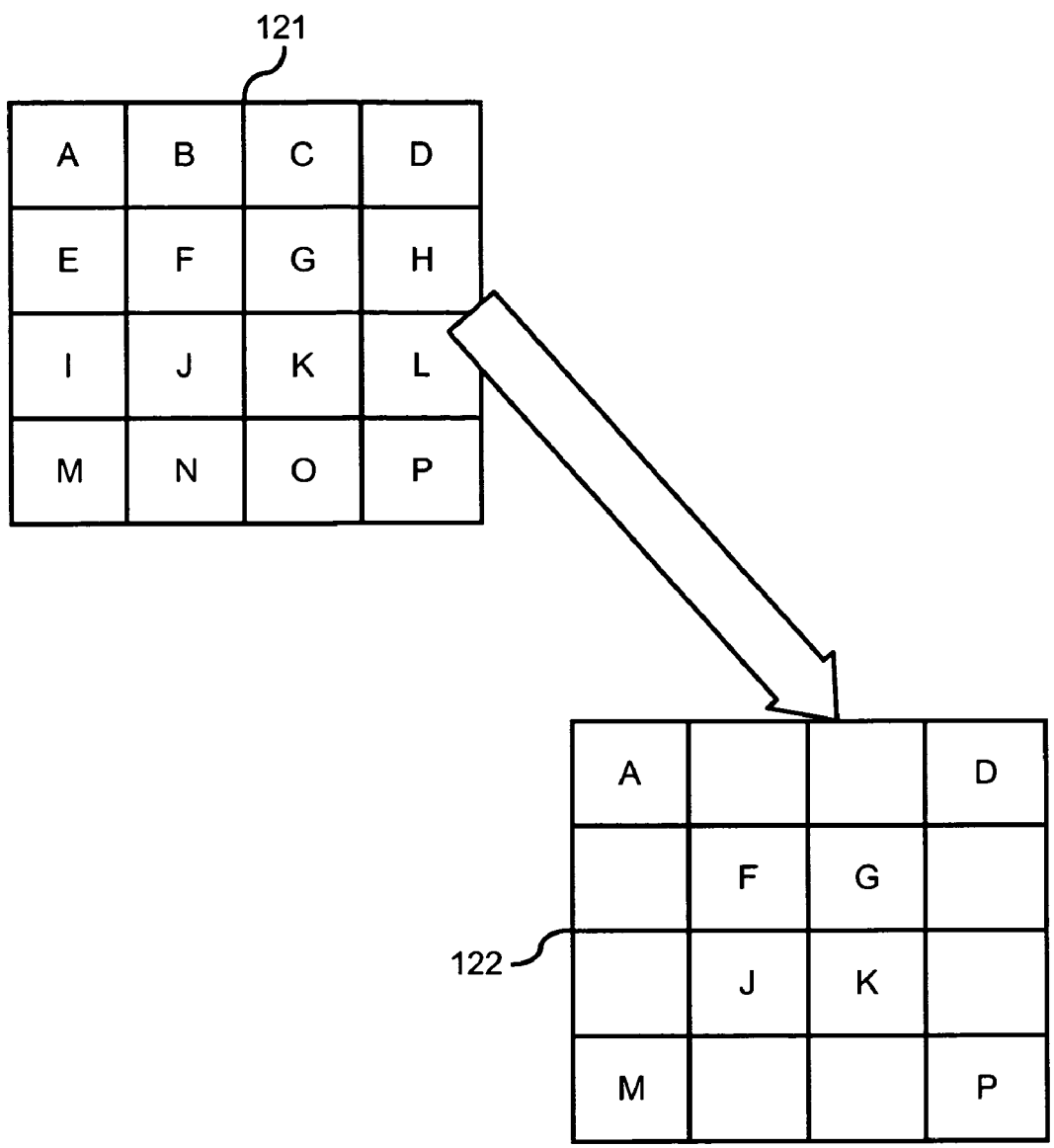
FIG. 5 is a schematic diagram illustrating the use of a mask in adaptive mask compression used in fast and high-quality implementations of the method of FIG. 2, according to an embodiment of the invention.

If the block has more than four colors and there is insufficient target capacity for untruncated raw transmission, BTC-VQ encoding is applied to the block at steps S34-S36. Only the 4×4 BTC-VQ mode with 24-bit colors is used in the fast method M2. In the illustrated embodiment, the luminance of the block is calculated at step S34. A block-transform coding is applied to the luminance map at S35. In this case, the 8×8-pixel block is broken into four 4×4-pixel quarters. The 24-bit colors are encoded and transmitted along with a binary mask at step S36. Normally, the mask data for each 4×4 sub-block requires two bytes. However, when adaptive mask compression is activated, a single byte may be transmitted for a 4×4 sub-block. See FIG. 5, comparing uncompressed mask 121 with compressed mask 122.

The compressed data from steps S32, S33, and S36 represents the end of the method M2 as far as the current block is concerned. However, the compression rate is fed back for use in the next iteration of step S23 for determination of whether there is room for raw transmission of the next block if it has five or more colors. Since the n-color modes and the 4×4 BTC-VQ mode achieve 6:1 compression, the feedback is only applied to determine whether or not the raw mode is used.

Figure 4:
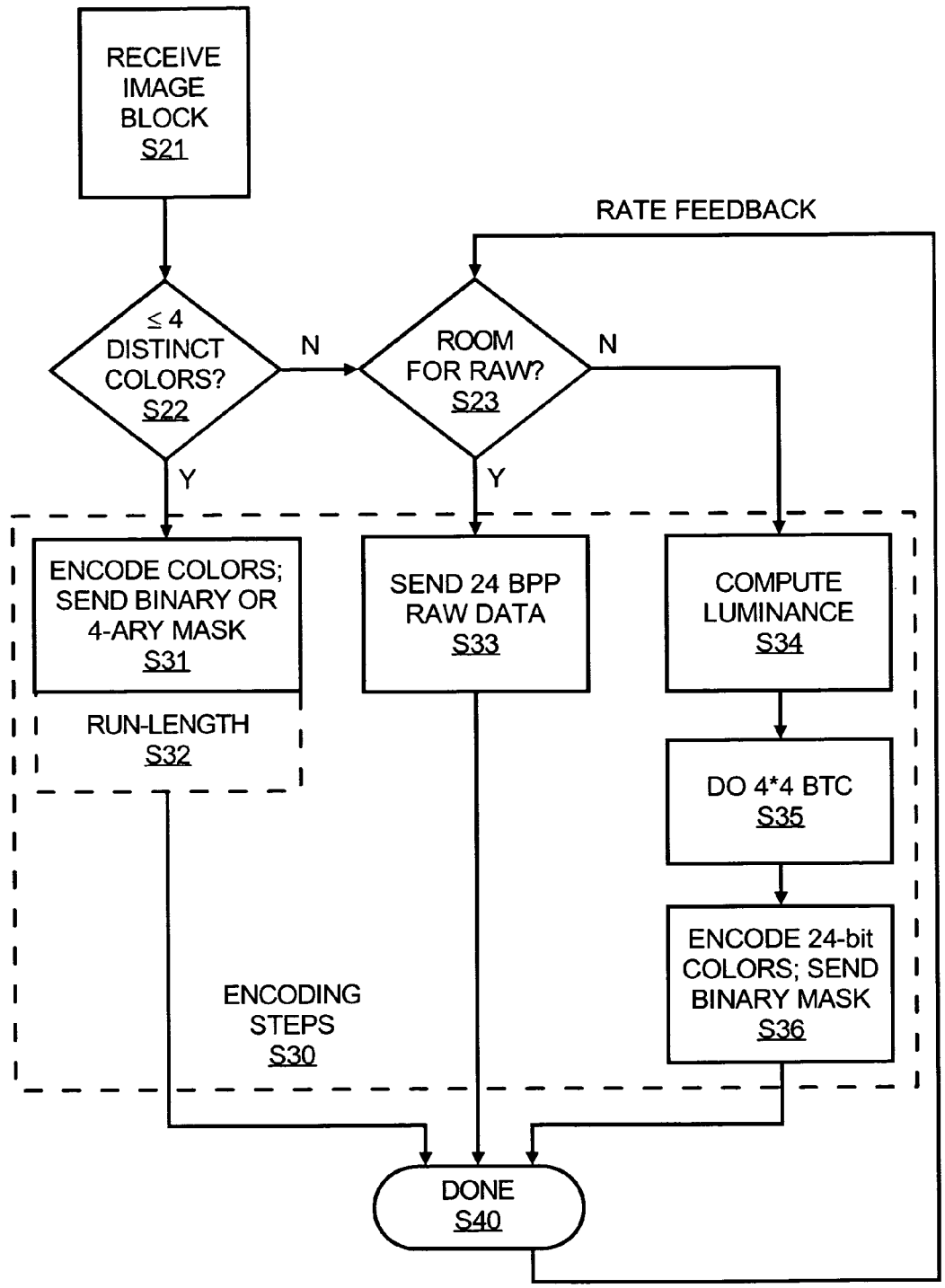
FIG. 4 is a flow chart of a "fast" implementation of the method of FIG. 2, according to an embodiment of the invention.

Note the correspondence between the steps of the method M2 shown in FIG. 4 and the steps of the method M1 shown in FIG. 2. Step S21 corresponds to step S3, receiving an image block. Step S22 corresponds to step S4. Step S23 and the lines to step S30 correspond to step S5. Step S30 corresponds to step S6. Step S40 roughly corresponds to steps S7 and S8.

A significant portion of the complexity of the fast encoder is attributed to BTC-VQ; accordingly it is important that it be optimized for speed. In the fast variant, the BTC-VQ encoder is a two-level vector quantizer (VQ) for each 4×4 sub-block, with the (R, G, B)-triplets for the pixels acting as the training set. While the optimal strategy is to use the LBG VQ design procedure taught by Y. Linde, A. Buzo, and R. M. Gray, "An algorithm for vector quantizer design," IEEE Trans. Commun., vol. COM-28, no. 1, pp. 84 95, January 1980, iterating until convergence between optimizing the encoding and the decoding rules, the complexity of such a scheme is too high for what fast variant M2 is targeted. Therefore, a sub-optimal but fast design procedure is used as follows.

Three-dimensional RGB vectors are mapped to one-dimensional space, and a single iteration of Lloyd's design procedure as described in S. P. Lloyd, "Least Squares Quantization in PCM," IEEE Trans. Inform. Theory, vol. IT-28, pp. 127 35, March 1982. This design procedure is used on the resulting scalar training set with the L infinity distortion measure. In particular, the mapping from 3-dim to 1-dim space is accomplished by either an approximate luminance transformation (R+2G+B)/4, or just by selection of the R, G, or B color that has the maximum spread in the sub-block. The search for the color with the largest spread usually leads to slower encoding than the luminance transformation, but it also leads to lower distortions.

In the one-dimensional space for each 4×4 block, the minimum value m and the maximum value M are determined. Let mid=(M+m+1)/2; let also M1 be the minimum value in the block such that M1>=mid and m1 be the maximum value in the block such that m1<=mid. Reconstruction points are calculated as the values (RGB(M1)+RGB(M)+1)/2 and (RGB(m1)+RGB(m)+1)/2, where RGB(x) denotes the original RGB value that corresponds to the value of x. The threshold for the classification is the mid value. The implementation is very simple, and requires only three passes through the whole 4×4 block.

Figure 6:
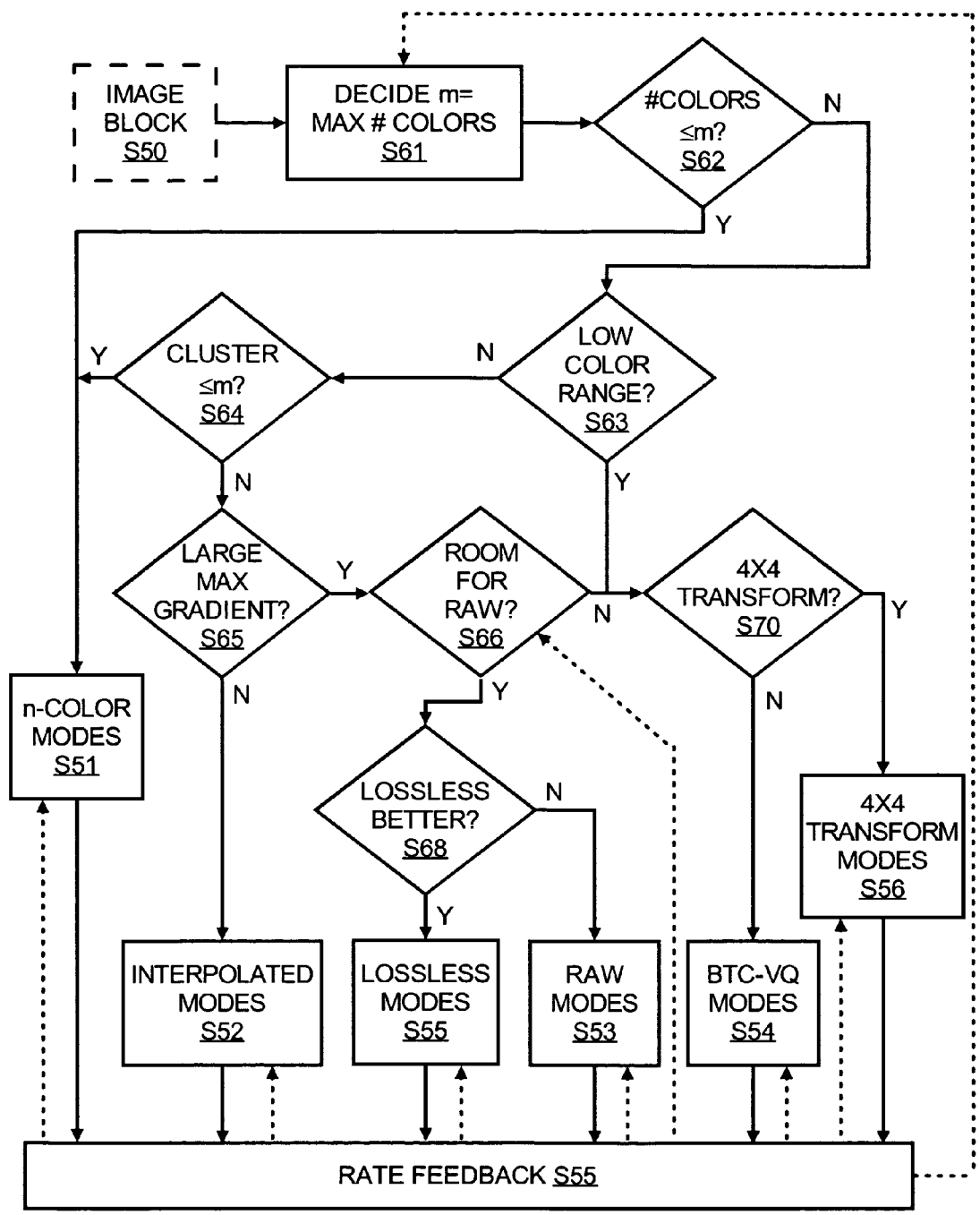
FIG. 6 is a flow chart of a "high-performance" implementation of the method of FIG. 2, according to an embodiment of the invention.

A "high-performance" variant method M3, charted in FIG. 6, applies more processing power to achieve greater compression than the fast variant method M2. The method M3 uses a flexible compound document codec that guarantees a compression ratio of up to 12:1 for all documents irrespective of content, while maintaining a level of encoding and decoding complexity lower than most known algorithms. To achieve this relatively high compression ratio, rate feedback is used at almost every stage to save bytes wherever possible.

The quality is visually lossless for both computer-generated as well as high-quality scanned documents at resolution 300 dpi and above. The method M3 is somewhat robust to scanning noise (more so than the method M2). Furthermore, the desired minimum compression ratio is supplied as a parameter to the encoder. The limit of 12:1 is solely cautionary and based entirely on quality considerations. It is in fact, possible to run the encoder with minimum desired compression ratio larger than 12:1, and the degradation in quality beyond 12:1 is gradual.

The method M3 begins with receiving an image block at step S50, its target size being determined in a previous iteration of the variant method M2. The method M3 results in the current block being encoded according to n-color modes S51, interpolated modes S52, raw modes S53, BTC-VQ modes S54, lossless modes S55, and 4×4 transform modes S56.

Mode selection at step S61 begins with a decision regarding a maximum number of colors m≦8 that can be transmitted in the n-color mode, with the current available bytes. This figure is obtained based on the number of bytes required to transmit m colors in m-color mode with 12-bit colors. The number of currently available bytes is a function of the target compression ratio and the rate feedback from step S55.

In effect, step S61 selects a classification scheme. This classification scheme is used in step S62 to determine whether or not an n-color mode S51 is to be used for compression. The eight n-color levels (n=1-8) are used with either 12-bit or 24-bit colors; an adaptive color dictionary is used for most of the n-color modes S51.

At step S62, a color counting routine checks to see if there are m or fewer distinct colors in the block using exact 24-bit color matches. In particular, pixels are scanned sequentially, and are either found to be exactly equal in color to one of the previously encountered colors, or used to create new colors. If the number of colors in the current block is less than or equal to m (for instance, indicating text or simple graphics), the colors obtained are transmitted in n-color mode. The color dictionary is consulted initially to check if any of the distinct colors already exist in it. Eventually however, depending on the current available bytes, either 24-bit colors with dictionary, or 12-bit colors without the color dictionary are transmitted. If the number of colors is greater than m, (as would be likely given a continuous-tone image block), the method M3 proceeds to step S63.

Step S63 determines whether the maximum color range, given by $\max[R_{max}-R_{min}, G_{max}-G_{min}, B_{max}-B_{min}]$, of the R, G, and B components in the 8×8 block is large (greater than a threshold $T_{HC}$) or small (less than or equal to $T_{HC}$). If the computed color range is below the threshold, a determination of whether a 4×4 transform mode may be used to compress the image block is made at step S70. More particularly, step S70 divides each color plane into 4×4 image blocks, and each of the image blocks is coded using a transform that approximates the discrete cosine transform (DCT). The transform matrix chosen is:

$$T = \begin{bmatrix} 0.5 & 0.5 & 0.5 & 0.5 \\ 0.65625 & 0.265625 & -0.265625 & -0.65625 \\ 0.5 & -0.5 & -0.5 & 0.5 \\ 0.265625 & -0.65625 & 0.65625 & -0.265625 \end{bmatrix} \quad \text{Equation (1)}$$

As shown in Equation (1), the coefficients have been chosen such that an implementation with only bit-shifts and additions is possible with 32-bit arithmetic. In addition, the transform is near-orthogonal, to thereby reduce or eliminate complications in compensating for the difference in energies of different coefficients during the following quantization process.

The inverse transform may be computed by scaling the second and fourth coefficients by 1/1.00244140625, which equals 0.997564539698, and then by computing a transform using the transpose of the transform matrix (T) above in Equation (1). That is:

$$T^{-1} = \begin{bmatrix} 0.5 & 0.65625 & 0.5 & 0.265625 \\ 0.5 & 0.265625 & -0.5 & -0.65625 \\ 0.5 & -0.265625 & -0.5 & 0.65625 \\ 0.5 & -0.65625 & 0.5 & -0.265625 \end{bmatrix} \quad \text{Equation (2)}$$

-continued $$\begin{bmatrix} 1 & 0 & 0 & 0 \\ 0 & 0.997564539698 & 0 & 0 \\ 0 & 0 & 1 & 0 \\ 0 & 0 & 0 & 0.997564539698 \end{bmatrix}$$

While the transformation with the T transpose may be computed using only bit-shifts and additions, multiplications are still needed for the scaling operation to obtain an exact inverse. However, two approximate inverses may be computed that enable a multiplication free inversion. First, 0.99756453969800 may be approximated by 1−1/512=0.998046875 which allows a computation using only bit-shifts and additions. Second, the scaling operation may simply be ignored because it is sufficiently close to 1.

Step S70 may apply the transformation to each block first horizontally and then vertically to obtain the transform coefficients. More particularly, the coefficients of the transform matrix T may be quantized by dividing a 4×4 quantization matrix and rounding to the nearest integer, for each available 4×4 transform coding mode. The quantization matrices may comprise powers of 2, to thereby enable computation of divisions by bit-shifts. In addition, the quantization matrix may differ for each available 4×4 transform coding mode. However, the quantization matrices for each coding mode are typically scaled versions of a baseline quantization matrix with the scale factor being a power of 2. In one example, there are two quantization modes ($Q_0$, $Q_1$), with the following quantization matrices:

$$Q_0 = \begin{bmatrix} 8 & 16 & 32 & 32 \\ 16 & 32 & 32 & 32 \\ 32 & 32 & 32 & 32 \\ 32 & 32 & 32 & 32 \end{bmatrix}; \quad \text{Equation (3)}$$

and $$Q_1 = 2 \times \begin{bmatrix} 8 & 16 & 32 & 32 \\ 16 & 32 & 32 & 32 \\ 32 & 32 & 32 & 32 \\ 32 & 32 & 32 & 32 \end{bmatrix}. \quad \text{Equation (4)}$$

The quantized coefficients are next entropy coded using one of 3 modes, each of which corresponds to a pattern matrix that constrains where the non-zero coefficients lie and also the maximum number of non-zero ac coefficients coded.

Step S70 may select a 4×4 transform coding mode, which may comprise one of six (6) coding modes described below if various conditions are satisfied. In addition, selection of one of the six (6) 4×4 transform coding modes described below to use may be based upon the number of non-zero AC coefficients for the component transforms and their locations. More particularly, one of the six (6) 4×4 transform coding modes described below may be selected based upon the satisfaction of certain criteria. The criteria are based upon the number of non-zero AC coefficients present for the transform blocks and locations of the AC coefficients.

The six (6) 4×4 transform coding modes may be selected according to the number of non-zero AC coefficients for sub-block transforms and the locations of the non-zero AC coefficients. More particularly, for a coding mode to be used for a sub-block, the number of non-zero AC coefficients for the transform blocks and the locations of the non-zero AC coefficients must satisfy certain criteria as described in greater detail herein below. Should a number of 4×4 transform coding modes satisfy the corresponding criteria, the first of the 4×4 transform coding modes may be selected that has the finest level of quantization and among the coding modes having the finest level quantization, the fewest number of bits to code.

To qualify for the first 4×4 transform coding mode, all of the transform blocks in the sub-block must contain no greater than three (3) non-zero AC coefficients on quantization with $Q_0$ (Equation (3)). In addition, none of the non-zero coefficients should be in the lower, right 6-coefficient triangle (shown by "*" below) depicted below with respect to Transform Block A. To qualify for the second 4×4 transform coding mode, all of the transform blocks in the sub-block must contain no greater than four (4) non-zero AC coefficients on quantization with $Q_1$ (Equation (4)). In addition, none of the non-zero coefficients should be in the lower, right 6-coefficient triangle (shown by "*" below) depicted below with respect to Transform Block A.

$$\begin{bmatrix} dc & ac & ac & ac \\ ac & ac & ac & * \\ ac & ac & * & * \\ ac & * & * & * \end{bmatrix}  \text{Transform Block A}$$

To qualify for the third 4×4 transform coding mode, all of the transform blocks in the sub-block must contain no greater than two (2) non-zero AC coefficients on quantization with $Q_0$. In addition, none of the non-zero coefficients should be in the lower, right 10-coefficient triangle (shown by "+" below) depicted below with respect to Transform Block B. To qualify for the fourth 4×4 transform coding mode, all of the transform blocks in the sub-block must contain no greater than three (3) non-zero AC coefficients on quantization with $Q_1$. In addition, none of the non-zero coefficients should be in the lower, right 10-coefficient triangle (shown by "+" below) depicted with respect to Transform Block B.

$$\begin{bmatrix} dc & ac & ac & + \\ ac & ac & + & + \\ ac & + & + & + \\ + & + & + & + \end{bmatrix}  \text{Transform Block B}$$

To qualify for the fifth 4×4 transform coding mode, all of the transform blocks in the sub-block must contain no greater than one (1) non-zero AC coefficients on quantization with $Q_0$. In addition, none of the non-zero coefficients should be among the coefficients shown by "$" below with respect to Transform Block C. To qualify for the sixth 4×4 transform coding mode, all of the transform blocks in the sub-block 308 must contain no greater than two (2) non-zero AC coefficients on quantization with $Q_1$. In addition, none of the non-zero coefficients should be among the coefficients shown by "$" below with respect to Transform Block C.

$$\begin{bmatrix} dc & ac & \$ & \$ \\ ac & \$ & \$ & \$ \\ \$ & \$ & \$ & \$ \\ \$ & \$ & \$ & \$ \end{bmatrix}  \text{Transform Block C}$$

Step S70 may also code the locations and the values of the non-zero coefficients. In this regard, each of the 4×4 transform coding modes described above may be associated with a different set of methods for coding locations of non-zero coefficients and their values. For the first and second coding modes described above, the locations of the non-zero AC coefficients may be conveyed by eight (8) bits. Although there were nine (9) possible locations for the AC coefficients, the last bit may be skipped, because whether the last bit is zero or not may be derived from the coding mode information. In addition, if all of the locations are the same for all of the components, a coding mode may be triggered that enables the location bits to be sent only once for the entire block, rather than for each component of the block.

For the third and fourth 4×4 transform coding modes, the locations of the non-zero coefficients may be conveyed using four (4) bits. Although there were five (5) possible locations for the AC coefficients, the last bit may be skipped because whether the last bit is zero or not may be derived from the coding mode information. Likewise, with respect to the fifth 4×4 transform coding mode, only one (1) bit per sub-block is required, while no bits are required for the sixth 4×4 transform coding mode.

As described above, the maximum numbers of bits allocated to the locations and values of the coefficients are set to efficiently utilize the bits in units of bytes. In this regard, the locations and values of the coefficients in the first and second coding modes make a total of thirty-two (32) bits or four (4) bytes. The locations and values of the coefficients in the third and fourth coding modes make a total of twenty-four (24) bits or three (3) bytes. In addition, the locations and values of the coefficients in the fifth and sixth coding modes make a total of sixteen (16) bits or two (2) bytes.

The locations of the non-zero coefficients may be determined. The magnitudes and signs of the coefficients may also be determined using a bit-allocation schedule predetermined for the selected 4×4 transform coding mode. For the first 4×4 transform coding mode shown with a maximum of three (3) non-zero AC coefficients, the bit allocation selected is seven (7) bits for the DC coefficient, and 6, 6, 5 for the three (3) non-zero AC coefficients in a zig-zag scan order of the AC coefficients. This bit allocation makes a total of twenty-four (24) bits. Thus, the locations and the values of the coefficients make a total of thirty-two (32) bits per component per sub-block.

With reference to Transform Block A, the zig-zag scan order begins with the AC coefficient located to the immediate right of the DC coefficient and goes to the AC coefficient located to the immediate bottom of the DC coefficient. The zig-zag scan order then goes to the AC coefficient located below the AC coefficient located directly below the DC coefficient, then to the AC coefficient located to the right of the AC coefficient located directly below the DC coefficient, and so forth.

For the second 4×4 transform coding mode, with a maximum of four (4) non-zero AC coefficients, the bit allocation selected is 6 for the DC coefficient, and 5, 5, 4, 4 for the four (4) non-zero AC coefficients in zig-zag scan order as described above. This bit allocation makes a total of twenty-four (24) bits. Thus, the locations and the values of the coefficients make a total of thirty-two (32) bits per component per sub-block.

For the third 4×4 transform coding mode, with a maximum of two (2) non-zero AC coefficients, the bit allocation selected is 7 for the DC coefficient, and 6, 6, for the two (2) non-zero AC coefficients in zig-zag scan order as described above. This bit allocation makes a total of nineteen (19) bits. In addition, for the fourth 4×4 transform coding mode, with a maximum of three (3) non-zero AC coefficients, the bit allocation selected is 6 for the DC coefficient, and 5, 5, 4, for the three (3) non-zero AC coefficients in zig-zag scan order as described above. This bit allocation makes a total of twenty (20) bits. Thus, the locations and the values of the coefficients make a maximum of twenty-four (24) bits per component 310 per sub-block 308 in the third and fourth 4×4 transform coding modes.

For the fifth 4×4 transform coding mode, with a maximum of one (1) non-zero AC coefficient, the bit allocation selected is 7 for the DC coefficient, and 6 for the non-zero AC coefficient. This bit allocation makes a total of thirteen (13) bits. For the fifth 4×4 transform coding mode, with a maximum of two (2) non-zero AC coefficients, the bit allocation selected is 6 for the DC coefficient, and 5, 5, for the two (2) non-zero AC coefficients in zig-zag scan order as described above. This bit allocation makes a total of sixteen (16) bits. Thus, the locations and the values of the coefficients make a maximum of 16 bits per component 310 per sub-block 308 in the fifth and sixth 4×4 transform coding modes.

A more detailed description of the 4×4 transform coding mode is provided in commonly assigned and copending U.S. patent application Ser. No. 11/113,250, filed on Apr. 22, 2005, and entitled "SYSTEM AND METHOD FOR COMPRESSING AN IMAGE", the disclosure of which is hereby incorporated by reference in its entirety.

Step S70 may check if the non-zero coefficients may be coded in any of the six (6) 4×4 transform coding modes described above. If yes, a 4×4 transform mode may be used to compress the image block at step S56.

If the non-zero coefficients may not be coded in any of the six (6) 4×4 transform coding modes, the image block is compressed using BTC-VQ at step S54. In the method M3, 4×4, 8×4, and 8×8 BTC-VQ modes are used with either 12-bit or 24-bit colors, and adaptive mask compression is used.

With reference back to step S63, if the color range is less than or equal to the threshold, the method M3 proceeds to step S64. At step S64, a color clustering routine determines whether the colors may be clustered into m or fewer color clusters. The color clustering routine uses a single pass clustering technique, where pixels are scanned sequentially, and are either included in one of the previous clusters if close enough, or used to create new clusters if significantly different from all previously created clusters. If m or fewer clusters are obtained, the block is represented in n-color mode with the representative colors being the average or the mid-point of the respective clusters. For color encoding, as in the case for distinct colors, either 24-bit colors with dictionary, or 12-bit colors without dictionary are used, based on the available bytes figure. Note that it is this clustering stage that incorporates robustness to scanning noise in the algorithm. If the number of clusters required is greater than m, method M3 proceeds to step S65.

At step S65, the maximum of the horizontal and vertical gradients is compared against a threshold $T_{GR}$. If the maximum color gradient is below this threshold, the block is compressed using an interpolation mode at step S52.

At step S52, an interpolation mode encodes the block by downsampling it by a factor 4×4 by averaging, and transmitting the four downsampled pixels in the bit-stream using 12- or 24-bit colors. An interpolation mode is well suited to gradients in complex business graphics and to smoothly changing colors in images.

If, at step S65, the maximum color gradient is equal to or above threshold $T_{GR}$, method M3 proceeds to step S66. Step S66 determines whether there is room for raw transmission of the current block for at least an 8-bit truncated raw mode. If there is sufficient room, the method M1 may determine whether a lossless mode would be better than a raw mode at step S68. More particularly, at step S68, the method M1 may determine whether the lossless mode may yield a compression bit-rate higher than the raw mode. If the lossless mode may yield a higher compression bit-rate, a lossless mode may be used to compress the current block at step S55.

In the lossless modes, the current block is coded losslessly using directional production. More particularly, for instance, each pixel of the current block is predicted from one of its nearest causal, in block scanning order, neighbors or a predictor which is a combination of neighbors. Suitable predictors may include an average or other non-linear predictor. In any case, the predictor used and the prediction residual is next coded lossless using several coding modes.

In one example, the following mechanism may be used to compress an image block under a lossless mode. Under this mechanism, pixels of the image are scanned in a row-wise direction, and for each pixel, one of five predictors based on its causal neighbors, as shown below, is used. For pixels on the edge or corner of the image block, where the non-existent neighbors are replaced by white (RGB={255,255,255}), black (RGB={0,0,0}), mid-gray (RGB={128,128,128}) and light-gray (RGB={192,192,192}), in that order depending on the number of missing predictors.

| B | C | D |
|---|---|---|
| A | X |   |

Predictors of current pixel X based on its causal neighbors:
P1: A
P2: B
P3: C
P4: D
P5: (A+C)/2

As an example, the same predictor may be used for all of the components of the pixel. More particularly, for an RGB color image, the same predictor may be used for the R, G, and B components of the pixel. The predictor may be selected, for instance, according to which predictor yields the smallest prediction error for all of the components combined, which may be determined by the encoder. In addition, a predictor index may be transmitted along with a prediction residual in a bit-stream.

According to another example, simplicity of entropy codes may be favored over coding efficiency, and as such, the following relatively simple coding mechanism using only integer bits per pixel may be used. The prediction residual for all components of a predicted pixel may be coded using either 2, 4, or 6 bits/component, depending on the range of values for the prediction residual. Thus, in 2, 4 and 6 bits/component residual coding modes, the range of prediction residuals for the all the components of the pixel must be [−2,1], [−8, 7], and [−32, 31] respectively. If the prediction residual for the best predictor cannot be coded using 6 bits/component, then the pixel is coded raw using regular 8 bits/component, as indicated at step S53.

Thus, the total number of coding modes per pixel is 5 (prediction modes) times 3 (residual coding modes) plus 1 (for the raw mode), which equals 16 coding modes. This symbol may be conveniently coded using 4 bits per pixel. This mode information is followed by either 2, 4, or 6 bits/component residuals for the prediction modes, or 8 bits/component in the raw mode.

In addition, in order to make reading and writing convenient in terms of integer bytes, for every group of four pixels, the coding modes are coded first (using 2 bytes), followed by the actual bytes for the prediction residual (using 3, 6 or 9 bytes for RGB data).

In a variant of the step S68, the lossless modes may be compared with both raw and truncated-raw modes in terms of bitrate. If the lossless rate is lower than both the raw and truncated-raw modes, then a lossless mode is selected at step S65. If the lossless rate is lower than the raw mode, but higher than the truncated-raw mode, then a lossless mode is selected only if there are enough bytes available for the lossless mode.

If there is sufficient room and the raw mode is better than the lossless mode in terms of, for instance, compression bitrate, the deepest mode, selected from 24-bit raw, 12-bit truncated raw, and 8-bit truncated raw, that may be accommodated by the available target block size is used to transmit the block. In this case, 12- and 8-bit truncated raw modes are provided for, so the threshold is less than for the corresponding step of method M2. (Bounding-box modes are not used.)

The threshold for step S66 depends on the current target block size, as indicated in FIG. 6 by the dashed arrow to step S66. If there is room for the most truncated raw mode, the method M3 proceeds to step S68. Otherwise, a determination of whether a 4×4 transform may be used to compress the current block is made at step S70, as described above. If the 4×4 transform may be used, then a suitable 4×4 transform mode is selected at step S56. If the 4×4 transform may not be used, then a BTC-VQ mode is selected at S54. Once one of the mode types is selected, the specific mode selected is a function of the current target block size, as indicated in FIG. 6 by the dashed arrows to steps S51, S52, S53, S54, S55, and S56.

In the BTC family of modes at step S54, the decision as to which support block size (4×4, 4×8, 8×4, or 8×8) will be used, is determined partly by the available bytes figure, and partly by the maximum color ranges (defined earlier) for each 4×4, 4×8, 8×4 or 8×8 support block. The idea is to choose support blocks of as small color ranges as possible, without exceeding the available bytes figure. Depending on the support block size chosen, the required number of colors is transmitted with 24 or 12 bits each. Additionally, adaptive lossy compression of the mask is turned on, if at least one pair of colors is found to be close to each other.

Determination of the color quantization levels in the BTC-VQ modes is accomplished by fast approximate VQ design procedures. Because VQ design is one of the most-significant complexity bottlenecks in the encoding process, three different algorithms for VQ design, with varying trade-offs between complexity and performance, are implemented "best", "normal", and "fast". The best encoding method uses a single iteration of LBG design procedure Y. Linde, A. Buzo, and R. M. Gray, "An algorithm for vector quantizer design," IEEE Trans. Commun., vol. COM-28, no. 1, pp. 84 95, January 1980 with the mean-squared-error distortion measure, on the RGB triplets. The normal encoding method uses a single iteration of Lloyd's scalar quantizer design procedure S. P. Lloyd, "Least Squares Quantization in PCM," IEEE Trans. Inform. Theory, vol. IT-28, pp. 127 35, March 1982, with the mean-squared-error distortion measure, on the R, G, or B color component with the maximum range. The fast method of encoding again uses a single iteration of Lloyd's scalar quantizer design procedure with the mean-squared-error distortion measure, on approximate luminance values of the pixels computed as L=(R+2G+B)/4. Additionally, in the fast method, all the range computations encountered earlier in various decision mechanisms, are based on the approximate luminance values as well ($L_{max}$-$L_{min}$). Best, normal, and fast methods are similar to print quality settings in a printer with the same names.

A variant of the method M3 omits interpolated modes S52 for faster throughput with a slight degradation is potential image quality. In this variant, when the number of color clusters is high at step S64, the variant method proceeds directly to room-for-raw step S66, omitting gradient threshold step S65. This variant avoids the added complexity of computing the maximum of the horizontal and vertical gradients in a block. However, including the interpolated mode produces better reproductions at higher compression for smooth image regions.

While the method M3 provides for compression at higher ratios than 12:1, there is a cost in quality and/or processing time. For example, while the method M3 may be run at a minimum desired compression ratio of 15:1, for 600+ dpi documents without artifacts, its per image encoding/decoding time may be too high (affecting throughput adversely).

Digitized documents at high resolutions require an enormous amount of storage. For example, a single-color letter-size page requires nearly 100 MB of storage at 600 dpi, and nearly 400 MB of storage at 1200 dpi. In order to keep hardcopy businesses competitive in price and performance at this resolution, it becomes imperative to design compound document encoders that achieve high compression ratios with very low complexity.

A high-resolution embodiment (not shown) of the invention achieves up to 15:1 compression without printed artifacts for compound documents at resolution 600 dpi and above, with very low complexity. The high-resolution method achieves compression ratios significantly higher than fast method M2 at a complexity that is lower than high-performance method M3. The trade-off is in the performance for low-resolution documents.

The high-resolution method uses exactly the same encoding modes as the methods M2 and M3, but the size of the elemental processing unit is larger. The high-resolution method uses 12×12 blocks as opposed to 8×8. In BTC-VQ modes, the support blocks may be of size 6×6, 6×12, 12×6, or 12×12.

Figure 7:
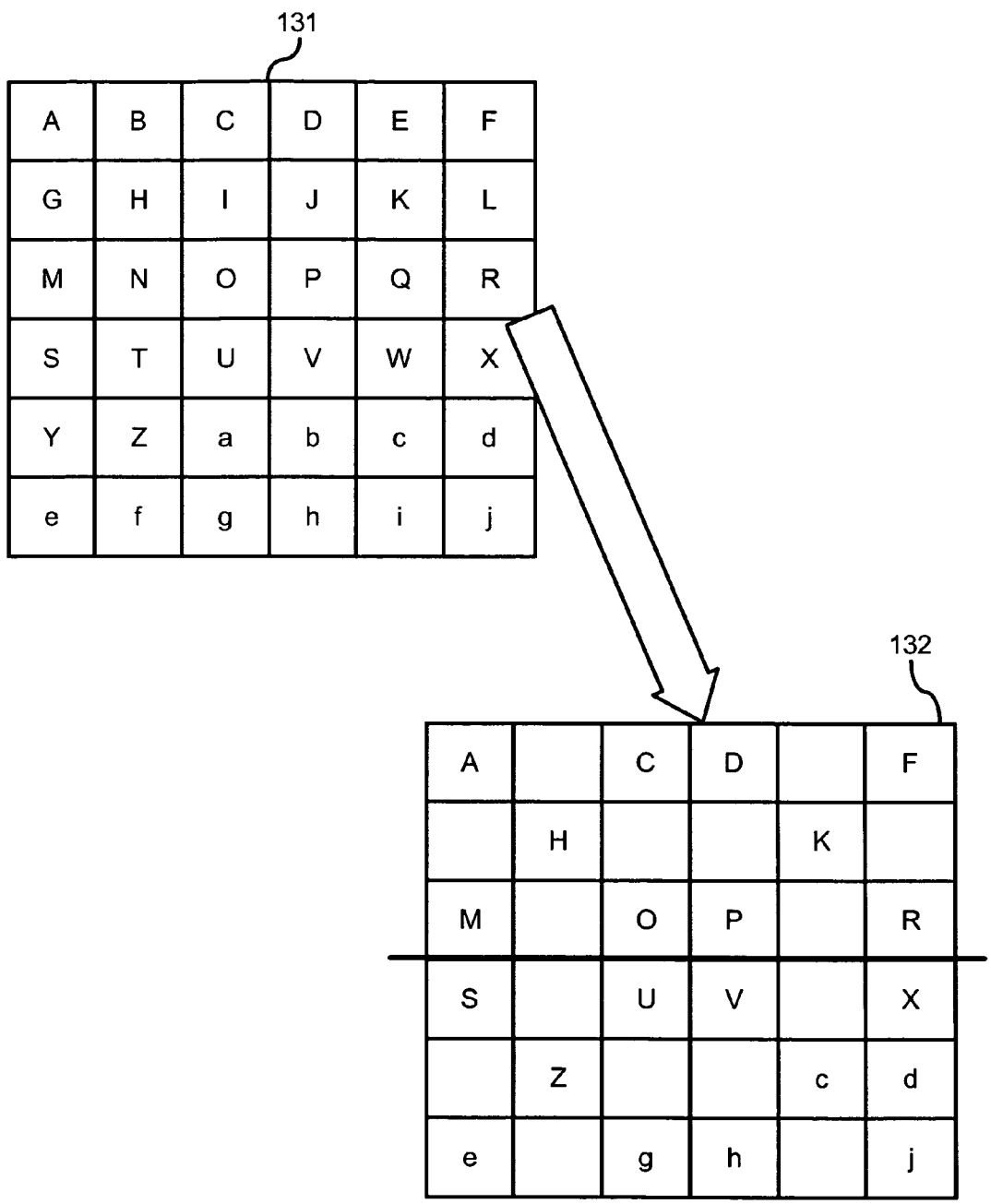
FIG. 7 is a schematic diagram illustrating the use of a mask in adaptive mask compression used in a "high-resolution" implementation of the method of FIG. 2, according to an embodiment of the invention.

In the n-color modes the sole difference is in the number of bytes sent for the mask data—indicated in FIG. 7. The 1-color mode does not require any mask data. The 2-color mode needs 18 bytes of mask data for a total of 144 pixels. The bits are entered within a byte from the MSB to the LSB in scan order. The 3-color mode requires 29 bytes for the mask data, with each byte containing information for five symbols in scan order. The 4-color mode requires 36 bytes for the mask data, with 2 bits entered in a byte per pixel from the MSB to the LSB in scan order. The 5- and 6-color modes need 48 bytes for the mask, where each byte contains three symbols in scan order. Finally, the 7- and 8-color modes need 54 bytes for the mask, with 3 bits for each pixel.

In the raw and truncated raw modes, the number of bytes that need to be transmitted are increased because of a larger number of pixels. Apart from the header, 144, 216 and 432 bytes are transmitted in the 8, 12, and 24 bpp modes respectively.

In the interpolated modes, the number of bytes that need to be transmitted in the interpolated modes change naturally because of a larger number of pixels. The downsampled image is now 3×3, and therefore requires 14 bytes (27 nibbles with the upper nibble of the last byte unused) in the 12-bit/pixel mode, and 27 bytes in the 24-bit/pixel mode, apart from the header.

In alternative embodiments, ease of hardware implementation drives the need for a compression algorithm using a 4-line buffer, as opposed to 8 lines for mainstream guaranteed-fit. This may be readily accommodated within the guaranteed-fit framework with minimal change in the bit-stream syntax. The basic block size is simply changed to 4×16 from 8×8, with four 4×4 sub-blocks arranged within it side by side. The pixel-scanning pattern is in row-column order within each 4×4 sub-block, and traverses sub-blocks at a time from left to right. Most of the modes may now be used without any modification. The BTC modes allowed for 4×16 guaranteed-fit would be 4×4, 4×8 and 4×16, which are analogous to 4×4, 8×4 and 8×8 BTC modes respectively for 8×8 guaranteed-fit, considering the pixel scan order. The 4×8 BTC mode for 8×8 guaranteed-fit is not useful in this scenario, and may well be disabled. All other modes may be used as is without any modification whatsoever.

The present compression scheme is optimized by making the results of the compression for each block available for selecting the compression mode for the next block. However, this may constrain performance and is not appropriate where blocks are processed in parallel for higher performance. Accordingly, the present invention provides for the compression scheme associated with any given block to be a function of the compression achieved for blocks earlier than the immediately preceding block. Where strips of blocks are processed in parallel, each parallel "strip" may implement the method M1 independently. Alternatively, the parallel processes may provide information to each other to optimize model selection. In other words, savings in one strip may inure to the benefit of another stripe.

Some or all of the operations illustrated in the methods M1, M2, and M3 may be contained as a utility, program, or a subprogram, in any desired computer accessible medium. In addition, the methods M1, M2, and M3 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

While the invention has been described above with particular encoding modes and profiles, other modes and profiles may be used. In the illustrated embodiment, the compression is block based; alternatively, the invention provides for data to be presented hierarchically or in non-pixel-based formats. While, in the illustrated embodiment, the data is image data, the invention actually applies irrespectively of the meaning of the data. The basic approach could be used for video, audio, and graphic data of many types. While the illustrated system is designed for incorporation in printers, the invention has industrial applicability whenever image or other data must be stored in a limited space or transmitted via a limited bandwidth. These and other variations upon and modifications to the illustrated embodiments are provided for by the present invention, the scope of which is defined by the following claims.

What is claimed is:

1. A method for compressing an image, said method comprising:
   a) converting source data into a series of blocks each containing one or more colors, said series of blocks including a first block, intermediate blocks, and a last block;
   b) determining a baseline target block size based upon a target compression ratio for said source data;
   c) for each block in turn, selecting a compression mode from mode families, wherein the mode families comprise an n-color mode family, an interpolated mode family, a raw mode family, a BTC-VQ mode family, a lossless mode family, and a 4×4 transform mode family;
   d) for each block in turn, compressing the block using the compression mode selected in step c) to yield a corresponding compressed block; and
   wherein step c) further comprises,
      c)(1) determining whether the number of colors in said block is less than or equal to a maximum number of colors capable of being transmitted in an n-color mode, while remaining within a current number of available bytes;
      c)(2) determining whether a maximum color range of the RGB components in the block is one of below and above a predetermined threshold in response to the number of colors in said block exceeding the maximum number of colors;
      c)(3) determining whether a 4×4 transform mode is capable of being used to compress the block in response to the maximum color range being above the predetermined threshold; and
   wherein step d) further comprises compressing the block using the 4×4 transform family mode in response to a determination that the maximum color range of the RGB components in the block is below the predetermined threshold at step c)(2) and that the 4×4 transform mode is capable of being used at step c(3).

2. The method according to claim 1, further comprising:
   e) for each block in turn, determining a current target block size, the current target block size for said first block being said baseline target block size, the current target block size for said intermediate block and said last block being equal to said current baseline target block size plus an accumulating savings associated with the preceding block in said series prior to step c).

3. The method according to claim 1, wherein step c) further comprises:
   selecting a compression mode from the mode families based upon the number of colors in said block, said compression mode being selected to compress that block so that the resulting compressed block fits its corresponding target block size as determined in step b).

4. The method according to claim 1, wherein step c) further comprises:

selecting the n-color mode family as the compression mode in response to the number of colors in said block being less than or equal to the maximum number of colors capable of being transmitted in an n-color mode, while remaining within a current number of available bytes.

5. The method according to claim 1, wherein step c) further comprises:

c)(4) determining whether the colors are capable of being clustered into less than or equal to the maximum number of colors in response to the maximum color range being below the predetermined threshold.

6. The method according to claim 5, wherein step c) further comprises selecting the n-color mode family in response to a determination that the colors are capable of being clustered into less than or equal to the maximum number of colors at step c)(4) and wherein step d) further comprises compressing the block using the n-color mode family.

7. The method according to claim 5, further comprising:

c)(5) determining whether a maximum of horizontal and vertical gradients exceeds a predetermined gradient threshold;

c)(6) determining whether there is sufficient room for raw transmission of the block for at least an 8-bit truncated raw mode in response to a determination that the maximum of horizontal and vertical gradients exceeds the predetermined gradient threshold; and wherein step d) further comprises compressing the block using the interpolated mode family in response to the maximum of horizontal and vertical gradients falling below the predetermined gradient threshold.

8. The method according to claim 7, further comprising:

c)(7) determining whether compression of the block under the lossless mode family provides a higher compression bit-rate than the raw mode family in response to a determination that there is sufficient room for raw transmission of the block at step c)(6);

wherein step d) further comprises compressing the block using the lossless mode family in response to the lossless mode family providing a higher compression bit-rate at step c)(7); and wherein step d) further comprises compressing the block using the raw mode family in response to the raw mode family providing a higher compression bit-rate at step c)(7).

9. The method according to claim 8, wherein compressing the block using the lossless mode family further comprises using a predictor to scan at least one pixel of the block and combining the predictor and a prediction residual jointly under a common symbol, wherein one or more pixels of the block are compressed using the lossless mode family.

10. The method according to claim 7, further comprising:

c)(7) determining whether the 4×4 transform mode is capable of being used to compress the block in response to a determination that there is insufficient room for raw transmission of the block at step c)(6);

wherein step d) further comprises compressing the block using the 4×4 transform family mode in response to a determination that the 4×4 transform mode is capable of being used at step c)(7); and wherein step d) further comprises compressing the block using the BTC-VQ mode family in response to a determination that the 4×4 transform mode is incapable of being used at step c)(7).

11. A system for compressing an image, said system comprising:

an encoder for sequentially compressing a series of source blocks, each source block containing one or more colors, said encoder implementing plural compression modes, said plural compression modes comprising an n-color mode family, an interpolated mode family, a raw mode family, a BTC-VQ mode family, a lossless mode family, and a 4×4 transform mode family;

a mode selector coupled to said encoder for selecting one of said compression modes for compressing a given source block based on the number of colors in said given source block, said mode selector selecting a compression mode at least in part as a function of a target block size for a current source block, wherein the mode selector is configured to determine whether the number of colors in said block is less than or equal to a maximum number of colors capable of being transmitted in an n-color mode, while remaining within a current number of available bytes, to determine whether a maximum color range of the RGB components in the block is one of below and above a predetermined threshold in response to the number of colors in said block exceeding the maximum number of colors, to determine whether a 4×4 transform mode is capable of being used to compress the block in response to the maximum color range being above the predetermined threshold, and to select the 4×4 transform mode in response to a determination that the maximum color range of the RGB components in the block is below the predetermined threshold and that the 4×4 transform mode is capable of being used; and an evaluator for determining the target block size for each of said source blocks; and an allocator for determining a baseline target block size based upon a target compression ratio for said source image.

12. The system according to claim 11, wherein said evaluator includes a block-size reader for determining the block size of a compressed block resulting from compressing of a respective source block, said evaluator determining said target block size in part as a function of the size of said compressed block.

13. The system according to claim 11, wherein the mode selector is configured to select the n-color mode family in response to the number of colors in the source block being less than or equal to a maximum number of colors capable of being transmitted in an n-color mode, while remaining within a current number of available bytes.

14. The system according to claim 11, wherein the mode selector is configured to determine whether there is sufficient room for compression under the raw mode family, to determine whether compression under the lossless mode family is better than compression under the raw mode family, and to select the lossless mode family in response to a determination that the lossless mode family is better.

15. The system according to claim 14, wherein the mode selector is configured to select the raw mode family in response to a determination that the raw mode family is better than the lossless mode family.

16. The system according to claim 15, wherein the mode selector is further configured to determine whether there is sufficient room for compression under the raw mode family in response to a maximum of horizontal and vertical gradients exceeding a predetermined gradient threshold, and wherein the mode selector is further configured to select the interpolated mode family in response to the maximum of horizontal and vertical gradients falling below the predetermined gradient threshold.

17. The system according to claim 11, wherein the mode selector is configured to use the BTC-VQ mode family to compress the given source block in response to a determination that the 4×4 transform mode family is incapable of being used to compress the given source block.

18. A non-transitory computer readable storage medium on which is embedded one or more computer programs, said one or more computer programs implementing a method for compressing an image, said one or more computer programs comprising a set of instructions for:

- converting source data into a series of blocks each containing one or more colors, said series of blocks including a first block, intermediate blocks, and a last block;
- determining a baseline target block size based upon a target compression ratio for said source data;
- for each block in turn, determining a current target block size, the current target block size for said first block being said baseline target block size, the current target block size for said intermediate block and said last block being equal to said current baseline target block size plus an accumulating savings associated with the preceding block in said series;
- for each block in turn, selecting a compression mode from mode families, wherein the mode families comprise an n-color mode family, an interpolated mode family, a raw mode family, a BTC-VQ mode family, a lossless mode family, and a 4×4 transform mode family; and
- for each block in turn, compressing the block using the selected compression mode to yield a corresponding compressed block;
- wherein selecting the compression mode further comprises,
  - determining whether the number of colors in said block is less than or equal to a maximum number of colors capable of being transmitted in an n-color mode, while remaining within a current number of available bytes;
  - determining whether a maximum color range of the RGB components in the block is one of below and above a predetermined threshold in response to the number of colors in said block exceeding the maximum number of colors;
  - determining whether a 4×4 transform mode is capable of being used to compress the block in response to the maximum color range being above the predetermined threshold; and
- wherein compressing the block further comprises compressing the block using the 4×4 transform family mode in response to a determination that the maximum color range of the RGB components in the block is below the predetermined threshold determination and that the 4×4 transform mode is capable of being used.

* * * * *

UNITED STATES PATENT AND TRADEMARK OFFICE
CERTIFICATE OF CORRECTION

PATENT NO.       : 7,751,633 B1
APPLICATION NO.  : 11/513808
DATED            : July 6, 2010
INVENTOR(S)      : Debargha Mukherjee Page 1 of 1

It is certified that error appears in the above-identified patent and that said Letters Patent is hereby corrected as shown below:

In column 18, line 50, in Claim 1, delete "c(3)." and insert -- c)(3). --.

Signed and Sealed this
Twenty-seventh Day of March, 2012

David J. Kappos
*Director of the United States Patent and Trademark Office*